(12) United States Patent  (10) Patent No.: US 6,459,531 B1
Min  (45) Date of Patent: Oct. 1, 2002

(54) SCREEN MOUNTING DEVICE FOR PROJECTION TV

(75) Inventor: Sung-Ki Min, Suwon (KR)

(73) Assignee: Samsung Electronics, Co., Ltd., Suwon (KR)

(*) Notice: Subject to any disclaimer, the term of this patent is extended or adjusted under 35 U.S.C. 154(b) by 7 days.

(21) Appl. No.: 09/672,971

(22) Filed: Sep. 29, 2000

(30) Foreign Application Priority Data

Dec. 14, 1999 (KR) .............................. 99-57620

(51) Int. Cl.$^7$ .......................... G03B 21/56; G02B 5/04
(52) U.S. Cl. ................. 359/450; 359/443; 359/449; 359/460; 359/836; 348/904
(58) Field of Search ................... 359/443, 450, 359/460, 449, 836; 348/904

(56) References Cited

U.S. PATENT DOCUMENTS 3,640,603 A * 2/1972 Balmes ..................... 359/450
5,581,407 A * 12/1996 Mitani et al. .............. 359/619
5,910,826 A * 6/1999 Aoki et al. ................. 348/781
6,084,707 A * 7/2000 Maruyama et al. ......... 359/460

* cited by examiner

Primary Examiner—David M. Gray
Assistant Examiner—Magda Cruz
(74) Attorney, Agent, or Firm—Robert E. Bushnell, Esq.

(57) ABSTRACT

A screen mounting device for a projection TV includes a mask for protecting an edge of a screen on which an image is displayed which is arranged to enclose an edge portion of the screen and having a hooking socket formed at a back side thereof, and a holder member for fixing the screen s and the mask to the cabinet. The holder member includes a coupling portion fitting in a front edge portion of the cabinet and fixed thereto, a hooking portion inserted in the hooking socket of the mask and coupled thereto, and a screen fixing portion in which the edge portion of the screen is inserted. Also, the coupling portion, the hooking portion and the screen fixing portion are integrally formed.

22 Claims, 5 Drawing Sheets

SCREEN MOUNTING DEVICE FOR PROJECTION TV

CLAIM OF PRIORITY

This application makes reference to, incorporates the same herein, and claims all benefits accruing under 35 U.S.C. §119 from my application PROJECTION TELEVISION filed with the Korean Industrial Property Office on Dec. 14. 1999 and there duly assigned Ser. No. 57620/1999.

BACKGROUND OF THE INVENTION

1. Field of the Invention

The present invention relates to a screen mounting device for a projection TV, and more particularly, to a screen mounting device for a projection TV having an improved structure for assembling a screen and a mask in the front of a cabinet.

2. Description of the Related Art

In general, a screen mounting device for a projection TV is an apparatus for forming an image by projecting an image to the rear surface of a screen from a projector. In setting up a projection television screen, the screen needs to be attached to a cabinet. In addition, a mask needs to be attached to the screen that is attached to the cabinet to cover the edge portions of the screen. A plurality of mask holders and screws were needed to attach the mask to the screen. In addition, a plurality of screen holders were needed to attach the screen to the cabinet. This required an enormous amount of parts to attach a mask to a screen and a screen to a cabinet.

What is needed is a more efficient design to attach a mask to a screen and a screen to a cabinet that requires fewer parts and fewer steps during the installation process.

SUMMARY OF THE INVENTION

Accordingly, it is an object to provide an improved apparatus and method for attaching a mask to a screen and a screen containing the mask to a cabinet.

It is also an object to merge two parts into one by providing a holding member that serves as both a mask holder and a screen holder.

It is yet an object to be able to easily manufacture this holding member by injection molding techniques.

It is still an object to provide a holding member that attaches the screen of a projection television to a cabinet and provides an attaching mechanism for attaching mask to the holding member.

It is yet another object of the present invention to provide a screen mounting device for a projection TV in which an assembly structure for coupling the screen and mask to the cabinet is simplified.

Accordingly, to achieve the above objective, there is provided a screen mounting device for a projection TV including a mask for protecting an edge of a screen on which an image is displayed which is arranged to enclose an edge portion of the screen and having a hooking socket formed at a back side thereof, and a holder member for fixing the screen and the mask to the cabinet, wherein the holder member comprises a coupling portion fitting in a front edge portion of the cabinet and fixed thereto, a hooking portion inserted in the hooking socket of the mask and coupled thereto, and a screen fixing portion in which the edge portion of the screen is inserted. Also, the coupling portion, the hooking portion and the screen fixing portion are integrally formed.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
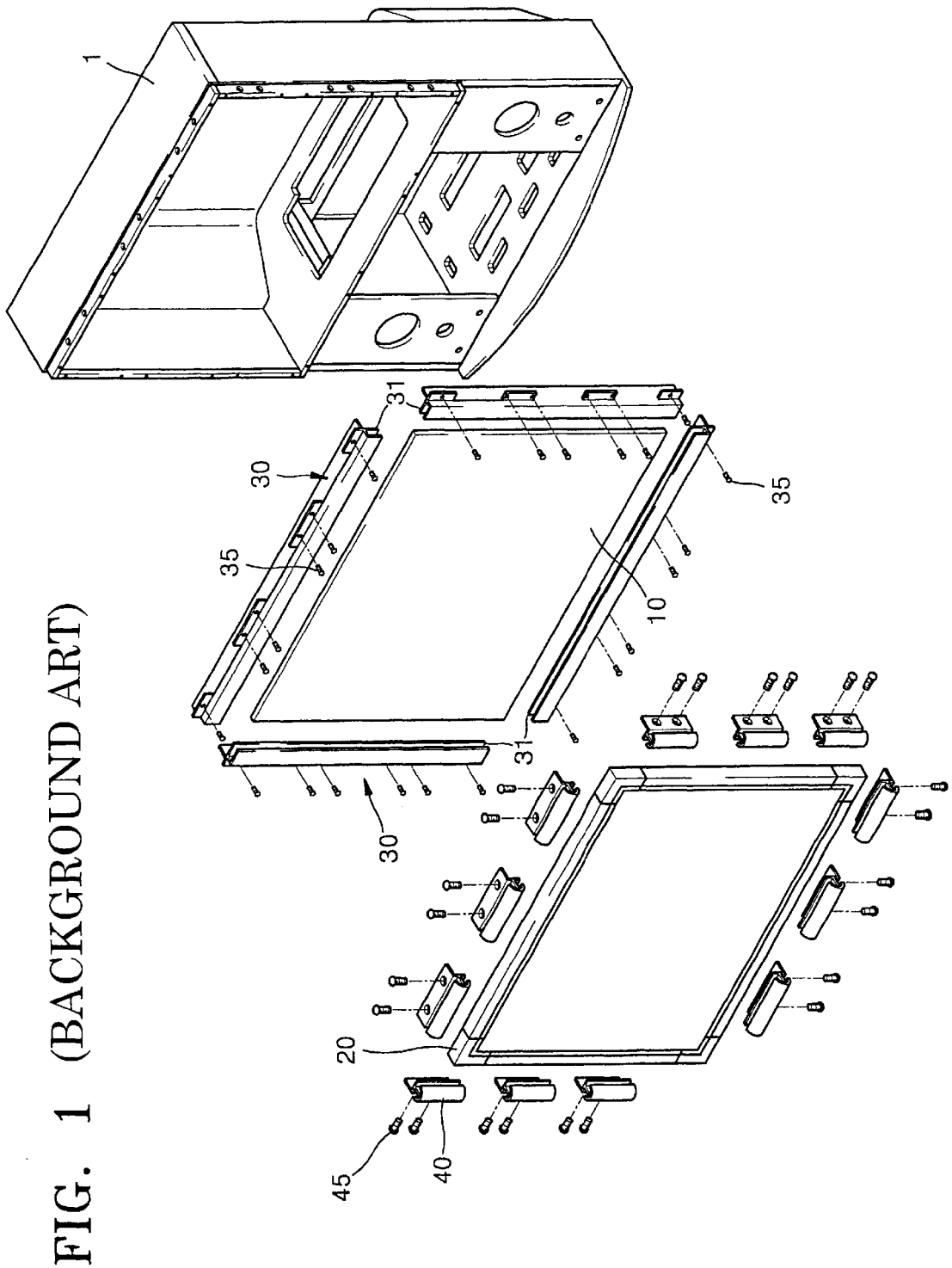
FIG. 1 is an exploded perspective view showing the major portions of a projection TV.

Referring to FIG. 1, a projection TV includes a cabinet 1 in which a projector (not shown) for projecting an image is installed. A screen 10 on which the image projected from the projector is displayed and a mask 20 for protecting the edge of the screen 10 are installed in the front of the cabinet 1. The screen 10 is coupled to the cabinet 1 by a screen holder 30 and the mask 20 is coupled to the cabinet 1 by a mask holder 40.

Figure 2:
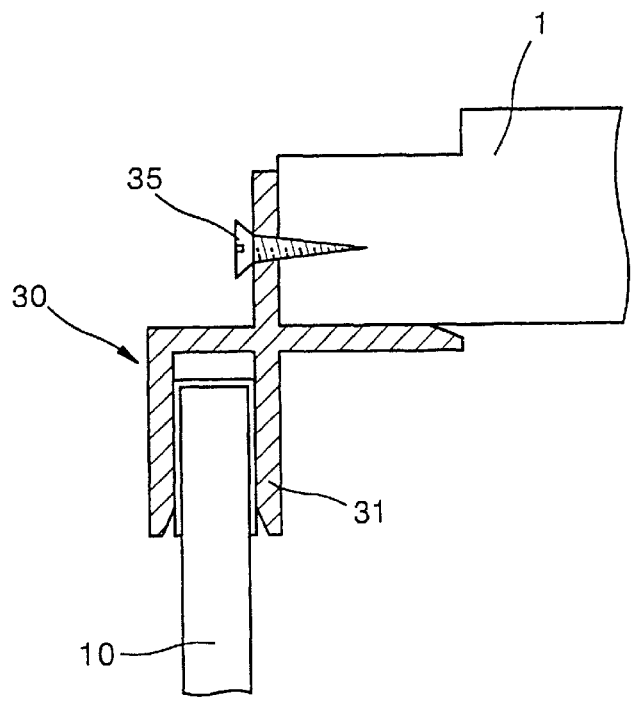
FIG. 2 is a sectional view showing the state in which the screen is coupled to the screen holder shown in FIG. 1.
Figure 3:
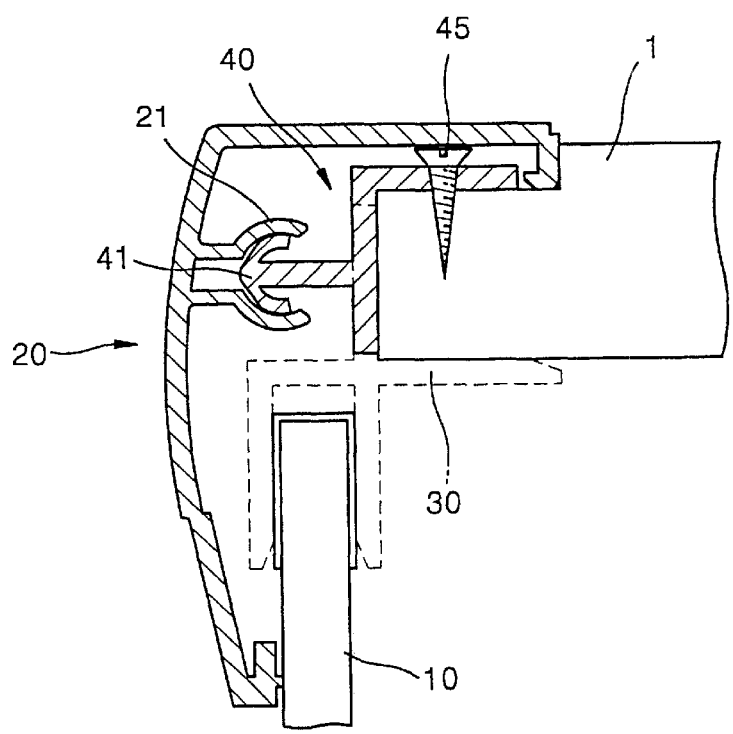
FIG. 3 is a sectional view showing the state in which the mask is coupled to the mask holder shown in FIG. 2.

Referring to FIGS. 2 and 3, the screen holder 30 is coupled to a front edge portion of the cabinet 1 and has a screen fixing portion 31 for fixing the screen 10. A hooking socket 21 is formed at the back of the mask 20. A hooking portion 41 protruding to be inserted into the hooking socket 21 of the mask 20 is formed at the mask holder 40.

When the projection TV is assembled, in the state shown in FIG. 1, the screen holder 30 is coupled to the screen 10 by inserting the edge portion of the screen 10 into the screen fixing portion 31 of the screen holder 30. Then, as shown in FIG. 2, the screen holder 30 is fixed to the front edge portion of the cabinet 1 using a screw 35. After the screen 10 is coupled to the front edge portion of the cabinet 1 by the screen holder 30, as shown in FIG. 3, the mask holder 40 is fixed to the front edge portion of the cabinet 1 using a screw 45. The mask 20 is coupled to the mask holder 40 so that the hooking portion 41 of the mask holder 40 is inserted into the hooking socket 21.

In the projection television of FIGS. 1 through 3, to assemble the screen 10 and the mask 20 to the cabinet 1, the screen holder 30 and the mask holder 40 are required and must be coupled by the screws 35 and 45 respectively. Thus, more number of parts are required for assembly and the number of work steps increases.

Figure 4:
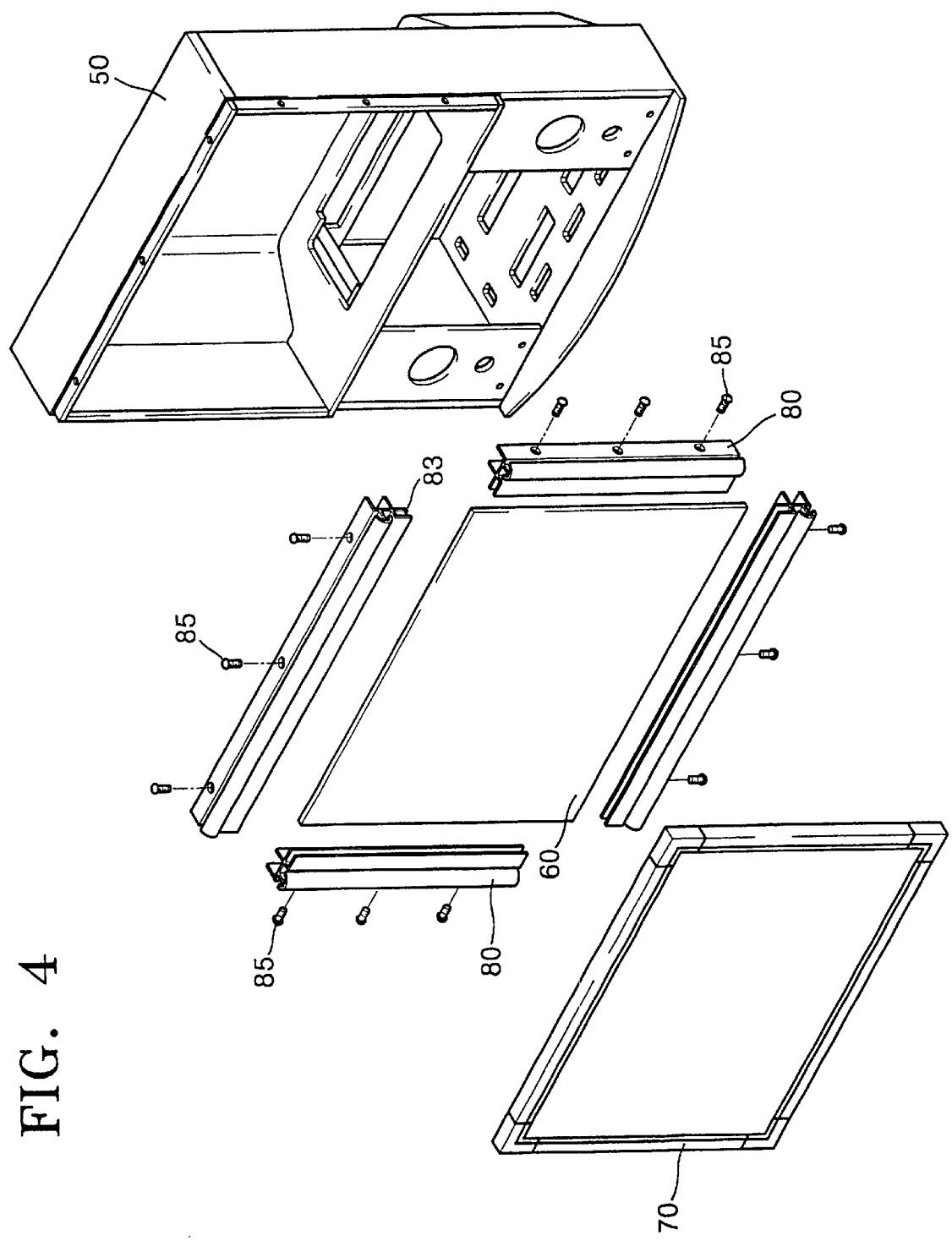
FIG. 4 is an exploded perspective view showing the major portions of the projection TV adopting a screen mounting device according to the present invention.
Figure 5:
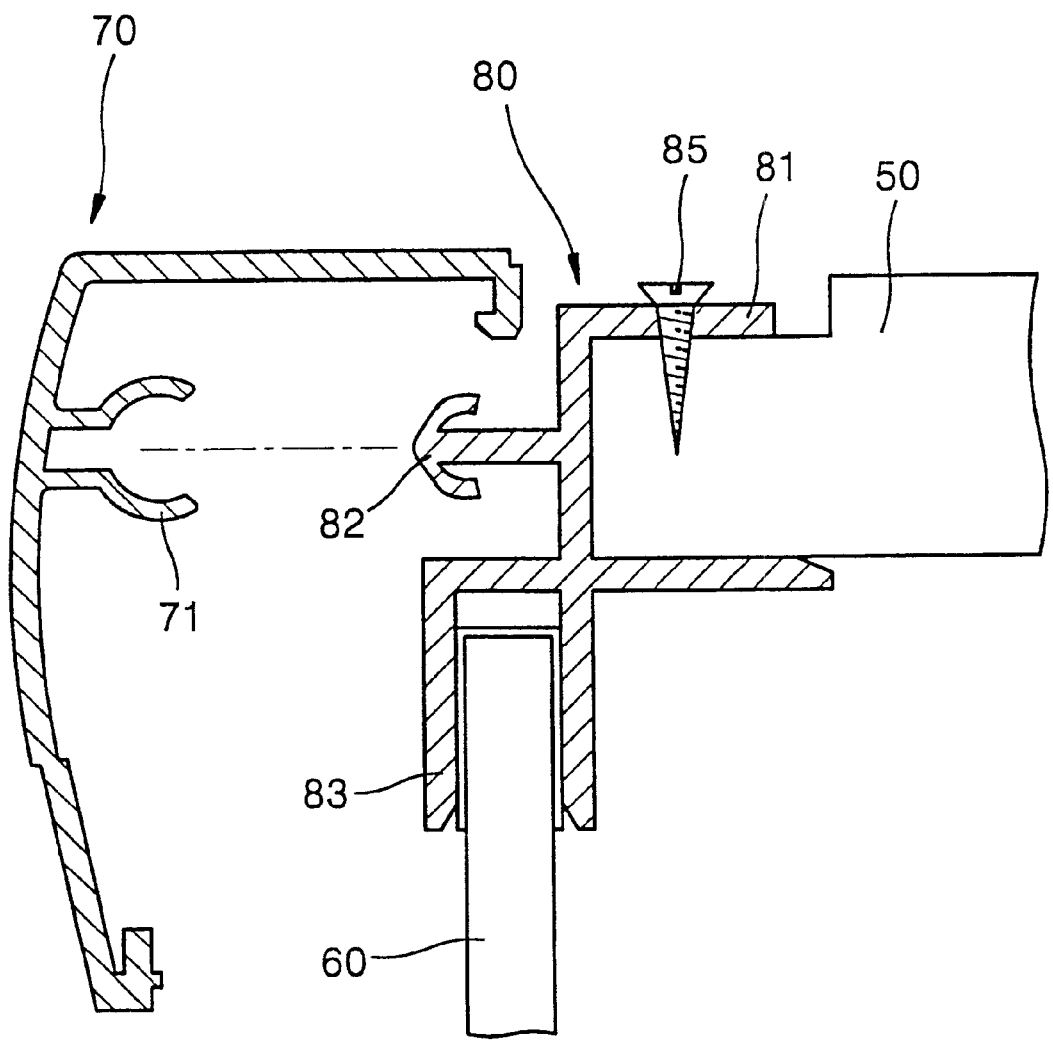
FIG. 5 is a sectional view showing the state in which the screen is coupled to the holder member shown in FIG. 4.
Figure 6:
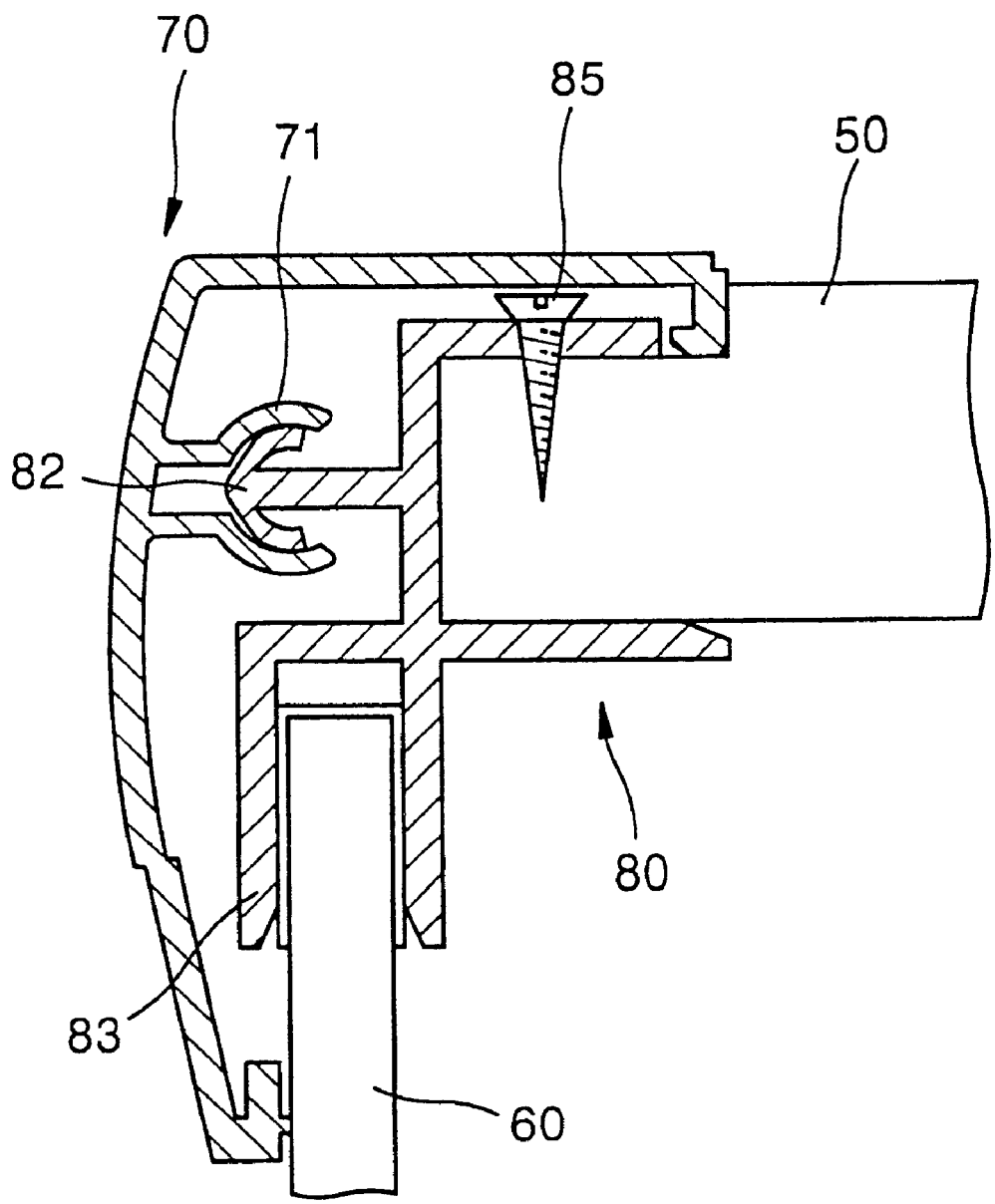
FIG. 6 is a sectional view showing the state in which the mask is coupled to the holder member shown in FIG. 5.

Referring to FIGS. 4 and 5, a screen mounting device for a projection TV according to the present invention for mounting a screen 60 on a cabinet 50 includes a mask 70 and a holder member 80. A projector (not shown) for projecting an image is installed inside the cabinet 50 and the front side of the cabinet 50 is open. The screen 60 is arranged at the front side of the cabinet 50 so that the image projected by the projector can be displayed. The mask 70 is arranged to enclose an edge portion of the screen 60 coupled to the cabinet 50 and coupled to the cabinet 50. A hooking socket 71 which is elastically deformable is formed at the back side of the mask 70. The holder member 80 couples the screen 60 and the mask 70 to the front side of the cabinet 50. A coupling portion 81, a hooking portion 82 and a screen fixing portion 83 are integrally formed with the holder member 80.

The coupling portion 81 fits firmly around the front edge portion of the cabinet and is fixed to the cabinet 50 using a screw 85. The hooking portion 82, which is formed to be elastically deformable, is inserted into the hooking socket 71 of the mask 70 to prevent the mask 70 from being separated therefrom. The screen fixing portion 83 is formed to be concave so that the edge portion of the screen 60 can be inserted therein. The holder member 80 is made by cutting a plastic material by a predetermined length after the plastic material is formed to be a predetermined cross-section or shape by injection molding.

When the screen mounting device for a projection TV having the above structure according to a preferred embodiment of the present invention is assembled, as shown in FIG. 4, the screen fixing portion 83 of the holder member 80 fits firmly around the edge portion of the screen 60. As shown in FIG. 5, after the coupling portion 81 of the holder member 80 fits in the front edge portion of the cabinet 50, the holder member 80 is fixed to the cabinet 50 using the screw 85.

After the holder member 80 is fixed to the cabinet 50, the mask 70 is coupled to the holder member 80. In the step of coupling the mask 70 to the holder member 80, the hooking portion 82 is inserted in to the hooking socket 71 so that the mask 70 is prevented from being separated from the holder member 80 since the elastically deformed hooking socket 71 and the hooking portion 82 are restored to the original shapes. Thus, in the screen mounting device for a projection TV according to the present invention, since the screen 60 and the mask 70 can be coupled to the cabinet 50 using the integrally formed holder member 80, the numbers of coupling parts and the assembly steps can be reduced compared to the conventional projection TV in which the screen 10 and the mask 20 are coupled using the screen holder 30 and the mask holder 40.

Although the screw 85 is used to fix the holder member 80 to the cabinet 50 in the preferred embodiment of the present invention, it is obvious that a typically known coupling means such as a bolt or a staple can be used. Also, although the holder member 80 is fixed to the cabinet 50 using the screws 85 after four holder members 80 are coupled to the screen 60 in the preferred embodiment of the present invention, the screen 60 is inserted in the screen fixing portion 83 of the three holder members 80 fixed to the cabinet 50 and then the remaining one holder member 80 is coupled to the screen 60 using the screw 85 after three holder member 80 are fixed to the cabinet 50 using the screw 85, by slightly deforming the screen 60 which is elastically deformable.

As described above, in the screen mounting device for a projection TV according to the present invention, the screen and the mask can be easily fixed by using the holder member integrally including the coupling portion coupled to the cabinet, the screen fixing portion to which the screen is coupled, and the hooking portion to which the mask is coupled. Thus, the manufacturing cost can be reduced.

It is noted that the present invention is not limited to the preferred embodiment described above, and it is apparent that variations and modifications by those skilled in the art can be effected within the spirit and scope of the present invention defined in the appended claims.

What is claimed is:

1. A screen mounting device for a projection TV including a mask for protecting an edge of a screen on which an image is displayed which is arranged to enclose an edge portion of the screen and having a hooking socket formed at a back side thereof, and a holder member for fixing the screen and the mask to the cabinet, wherein the holder member comprises:

a coupling portion fitting in a front edge portion of the cabinet and fixed thereto;

a hooking portion inserted in the hooking socket of the mask and coupled thereto; and a screen fixing portion in which the edge portion of the screen is inserted, wherein the coupling portion, the hooking portion and the screen fixing portion are integrally formed.

2. The screen mounting device as claimed in claim 1, wherein the holder member is formed by injection molding.

3. The screen mounting device of claim 1, wherein screws are used to attach said coupling portion of said holder member to said cabinet.

4. The screen mounting device of claim 3, wherein only three screws are needed to attach said coupling portion to said cabinet.

5. The screen mounting device of claim 1, wherein only one holder member is attached to each edge of said screen.

6. A method for attaching a screen and a screen mask to a cabinet, comprising the steps of:

attaching a holder member to each edge of said screen;

attaching said screen, with said holder members attached thereto, to said cabinet;

coupling permanently said holder members, holding said screen, to said cabinet; and attaching said screen mask to said screen, said cabinet, and said holder members, said screen mask being a single integrated monolithic unit and covering said holder members.

7. The method of claim 6, each of said holding members having a hooking protrusion, said screen mask comprising a hooking socket that attaches to said hooking protrusion of a holding member firmly attaching said screen mask to said cabinet, said screen and said holder member.

8. The method of claim 6, wherein said coupling step comprises fastening a plurality of screws to permanently attach said holder members to said cabinet.

9. The method of claim 6, wherein said coupling step comprises fastening a plurality of staples to permanently attach said holder members to said cabinet.

10. The method of claim 6, wherein said coupling step comprises fastening a plurality of bolts to permanently attach said holder members to said cabinet.

11. The method of claim 6, wherein said screen is essentially rectangular in shape.

12. The method of claim 6, wherein four holder members are used to attach said screen to said cabinet.

13. The method of claim 6, wherein said step of attaching said holder member to said screen is preceded by making said holder member by injection molding.

14. A projection television, comprising:

a cabinet;

a projection screen mounted to said cabinet;

a mask to enclose an edge portion of said projection screen;

a plurality of holding members, for attaching said mask and said projection screen to said cabinet, wherein each of said holding members comprises a single integrated monolithic unit.

15. The projection television of claim 14, further comprising a plurality of screws for attaching said plurality of holder members to said cabinet.

16. The projection television of claim 14, further comprising a plurality of staples for attaching said plurality of holder members to said cabinet.

17. The projection television of claim 14, further comprising a plurality of bolt s for attaching said plurality of holder members to said cabinet.

18. A screen mounting device for a projection TV, comprising:

a holder member, comprising:

a coupling portion fitting in a front edge portion of the cabinet and fixed thereto;

a hooking portion; and a screen fixing portion in which the edge portion of the screen is inserted, wherein the coupling portion, the hooking portion and the screen fixing portion are integrally formed; and a mask protecting an edge of a screen where an image is displayed, said mask comprising a hooking socket formed at a back side of said mask, said hooking socket attaching to said hooking portion of said holder member to attach said mask to said screen, said mask covering said holder member.

19. The device of claim 18, the holder member being formed by injection molding.

20. The device of claim 18, screws being used to attach said coupling portion of said holder member to said cabinet.

21. The device of claim 20, only three screws are needed to attach said coupling portion to said cabinet.

22. The of claim 18, only one holder member being attached to each edge of said screen.

\* \* \* \* \*